United States Patent [19]

Patterson et al.

[11] Patent Number: 5,271,918
[45] Date of Patent: Dec. 21, 1993

[54] FURNACE GAS - SULFURIC ACID CONTACT PROCESS FOR HF MANUFACTURE

[75] Inventors: Audie J. Patterson, Atlanta, Ga.; Robert A. Smith, Kinnelon, N.J.; Theodore J. Jenczewski, Sherrill, N.Y.

[73] Assignee: AlliedSignal Inc., Morristown, N.J.

[21] Appl. No.: 666,957

[22] Filed: Mar. 11, 1991

[51] Int. Cl.$^5$ .............................................. C01B 7/19
[52] U.S. Cl. ................................. 423/485; 423/240 R
[58] Field of Search ........................ 423/485, 240 R

[56] References Cited

U.S. PATENT DOCUMENTS

| | | | |
|---|---|---|---|
| 2,702,233 | 2/1955 | Mitchell et al. | 423/485 |
| 3,919,399 | 11/1975 | Schabacher et al. | 423/488 |
| 4,150,102 | 4/1979 | Schabacher et al. | 423/485 |
| 4,460,551 | 7/1984 | Boese et al. | 423/166 |

FOREIGN PATENT DOCUMENTS 1004389 9/1965 United Kingdom .

Primary Examiner—Michael Lewis
Assistant Examiner—Stuart L. Hendrickson
Attorney, Agent, or Firm—Darryl L. Webster; Melanie L. Brown; Jay P. Friedenson

[57] ABSTRACT

A method is provided wherein the equilibrium HF concentration in the mixture of HF, sulfuric acid and water fed to an HF reaction furnace is greatly reduced by injecting a controlled amount of steam into an HF-removal process wherein the sulfuric acid mixture is also contacted with the hot HF gas leaving the HF reaction furnace. Reducing the HF concentration in this manner significantly improves furnace performance.

The purpose of injecting steam is to adjust the water content of the mixture to the optimum value (about 12.5 weight percent) for HF removal, as well as to supply the heat required for HF removal without the need for an indirect heat exchanger.

An additional advantage to this method is that since direct steam injection adds water to the process, in order to keep the furnace feed acid water concentration at the desirable level of less than 1%, oleum or $SO_3$ must be added to react with the excess water. Since the reaction of water and $SO_3$ is exothermic, this supplies additional heat to the process and no indirect heat exchanger is needed to achieve the desired high furnace feed acid temperature (>100° C.).

10 Claims, 3 Drawing Sheets

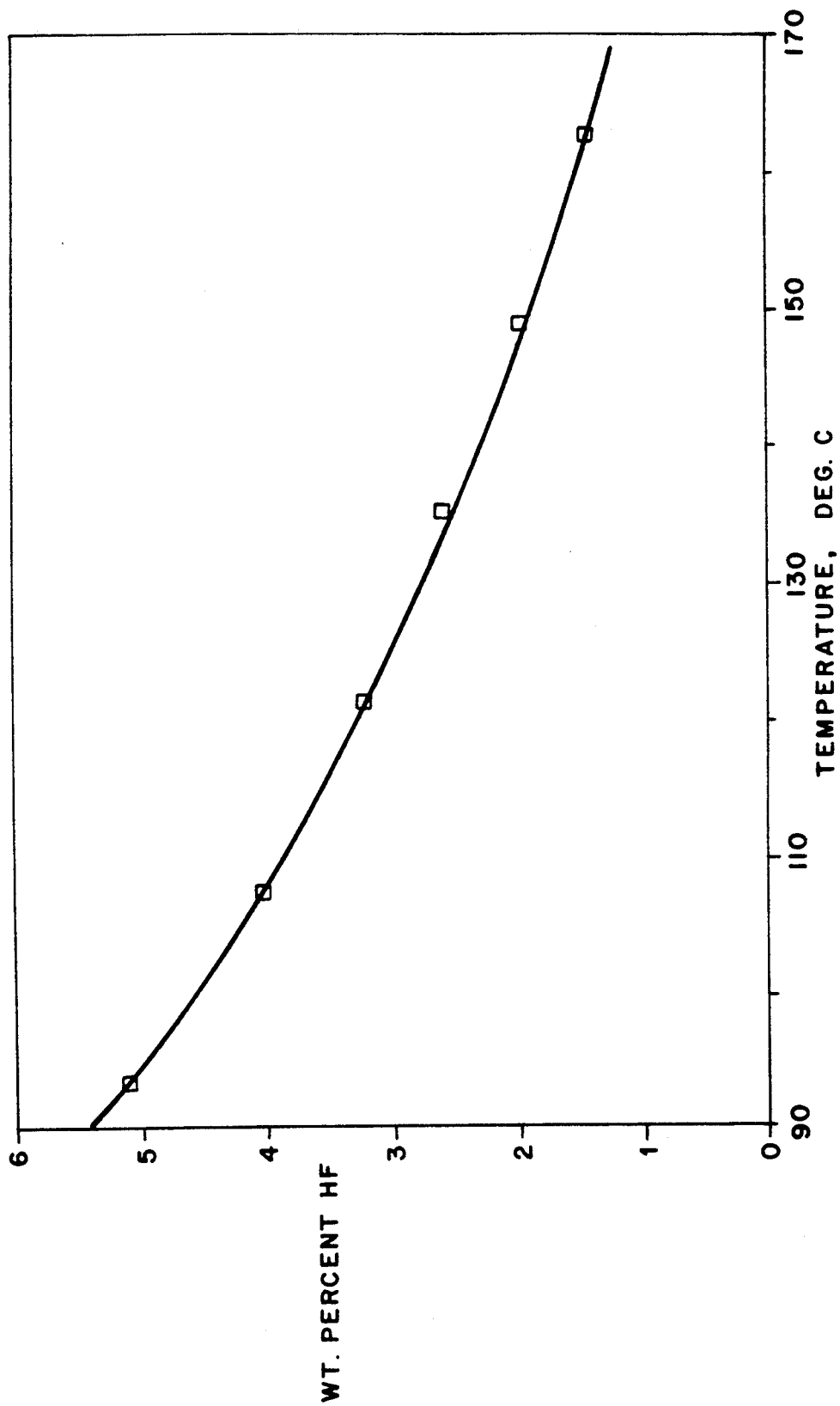

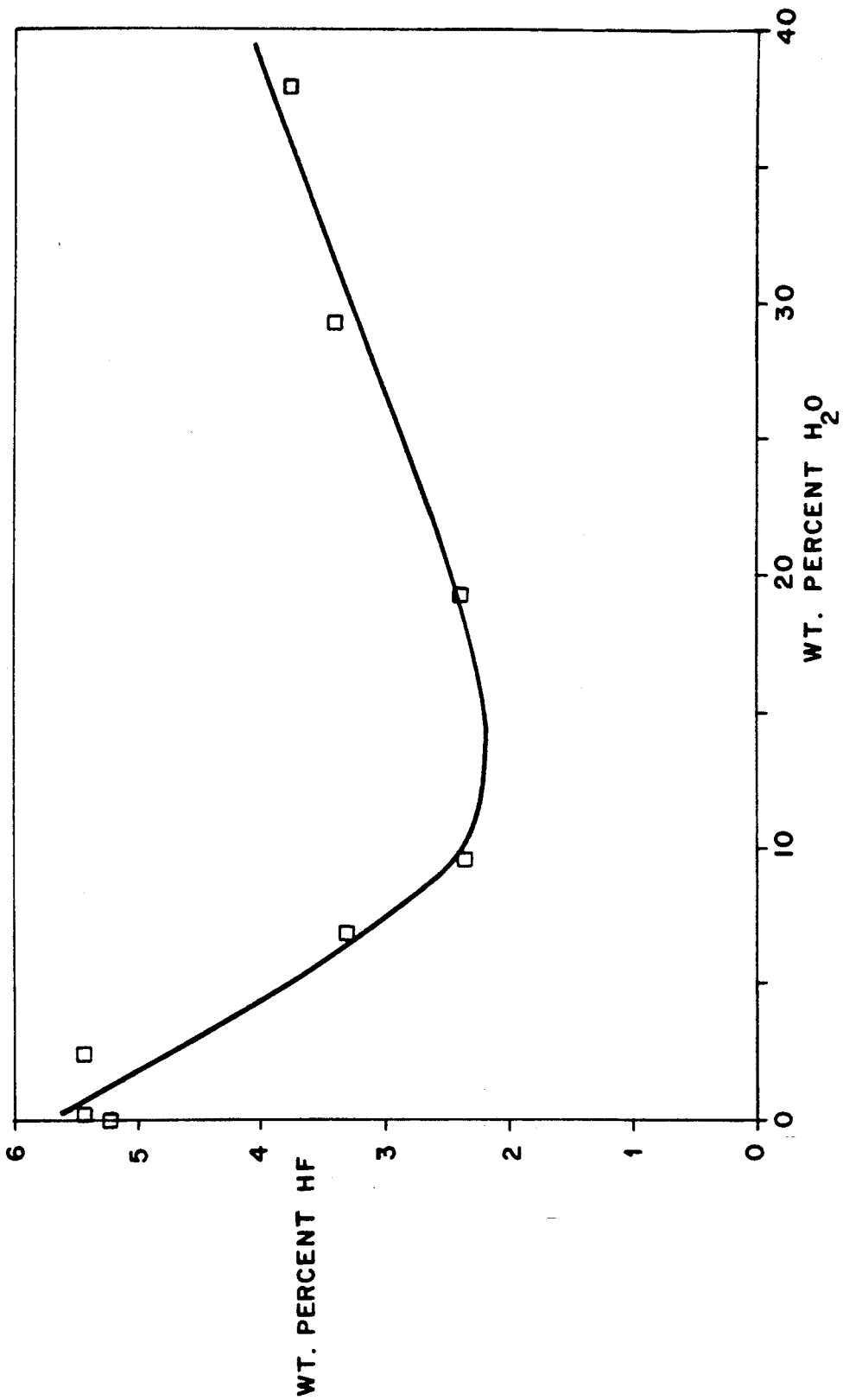

FURNACE GAS - SULFURIC ACID CONTACT PROCESS FOR HF MANUFACTURE

The present invention relates to an method for the manufacture of hydrofluoric acid and more particularly to an improved furnace gas-sulfuric acid contact method of producing hydrofluoric acid which takes advantage of the unique equilibrium properties of the system.

BACKGROUND OF THE INVENTION

A common industrial method for production of hydrofluoric acid (HF) involves reacting fluorspar ore (containing $CaF_2$) with sulfuric acid in an externally above, the reaction being:

$$CaF_2 + H_2SO_4 \rightarrow 2HF + CaSO_4$$

Minor constituents in the fluorspar also react to give such by-products as $SO_2$, $SiF_4$, $CO_2$, $H_2O$, and various phosphate compounds. These materials are present, along with $CaF_2$ and/or $CaSO_4$ dust as well as air which may leak into the furnace, as contaminants in the hot HF gas stream leaving the furnace.

Various methods for recovering and purifying the HF are detailed in the patent literature, see for example, U.S. Pat. Nos. 3,919,399; 4,150,102; 4,460,551. Typically, these processes entail steps such as indirect gas cooling, direct gas cooling and purification by contact with sulfuric acid or HF, and product HF recovery by indirect condensation using brine and/or refrigerant. The gases leaving the final HF condensers, containing mainly air, $CO_2$, $SiF_4$, $SO_2$ and other low-boiling compounds, typically contain significant quantities of HF which must be recovered to achieve acceptable process yields.

A standard method for recovering the HF involves absorbing the HF from the gas stream using sulfuric acid, and then using this sulfuric acid as feed acid to the furnace; in this way, the HF is recovered and recycled to the process via the furnace. Additional HF may also be recovered and recycled to the furnace from several of the direct or indirect cooling steps occurring prior to the final product condensation. However, this method of recovering HF is detrimental to furnace operation. Additional heat must be provided to the furnace to vaporize this recycled HF, and 10-20% of the total heat supplied to the furnace may be consumed in this manner. In addition to lowering energy efficiency, this increases the required size of the furnace.

Since the furnace and its auxiliary equipment usually represents the single most expensive item in the cost of constructing an HF plant, the presence of recycled HF in the sulfuric acid fed to the furnace can lead to a significantly higher plant investment cost. The increase in furnace size required to deal with the recycled HF may in fact be greater than the 10-20% expected based solely on heat requirements. The reason for this is that an HF furnace is, among other things, a heat transfer device, and its size is thusly determined not only by heat load but also by heat transfer coefficient. It is desireable that the material in contact with the hot furnace wall have a dry or crumbly consistency. U.S. Pat. No. 4,460,551 teaches that the presence of HF in the feed sulfuric acid (specifically in cold acid, under 100° C.) results in the formation of fluosulfonic acid ($HFSO_3$) in the feed acid via the reaction:

$$HF + H_2SO_4 \rightarrow HFSO_3 + H_2O$$

The presence of fluosulfonic acid can lead to formation in the furnace of various intermediate compounds (e.g. calcium fluosulfonate) which produce viscous or sticky materials which cake on the furnace wall, thus reducing the heat transfer coefficient and further increasing the required furnace size. In addition, formation of sticky material is detrimental to the good mixing which is desireable in the furnace, and this can lead to increased residence time requirements, further increasing furnace size.

Several possible methods for reducing HF in furnace feed acid are discussed in the patent literature.

U.S. Pat. No. 3,919,399 presents a method whereby the sulfuric acid prior to being fed to the furnace is contacted with the hot gas leaving the furnace, thus heating the sulfuric acid. However, the claimed maximum sulfuric acid temperature of 120° C. is not high enough to result in a significantly reduced HF solubility, and hence this acid would still contain a high concentration of HF. The effect of temperature on the equilibrium HF concentration of sulfuric acid mixtures is demonstrated in FIG. 2. It can be seen that the equilibrium HF concentration at 120° C. is about twice that at 160° C., which is the preferred operating temperature of the present invention, as described below. A second embodiment referred to in U.S. Pat. No. 3,919,399 mentions "preheating" the furnace feed acid stream to 110°-180°; while at the latter temperature significant HF removal would occur, exotic and expensive materials and construction would be required for such a preheater. Furthermore, in the example detailed in U.S. Pat. No. 3,919,399, the furnace feed acid is stated as containing 4% water; as described below in the discussion of the present invention, this is substantially less than the optimum water content required for HF removal, yet is higher than desireable as regards furnace operation (water, like HF, requires additional heat in the furnace for vaporization).

U.S. Pat. No. 4,150,102 is a refinement of U.S. Pat. No. 3,919,399, the primary objectives of which are improved product quality and reduced equipment pluggage. No mention is made as to the amount of reduction in feed acid HF to be expected, nor is this claimed as a benefit of the patent. The patent detail does state that some HF is evolved from the feed acid; however, as in the case of U.S. Pat. No. 3,919,399, the specified temperature of 120° C. is too low for effective HF removal.

U.S. Pat. No. 4,460,551 details a process for removing HF from the sulfuric acid. This is done in two steps. First, the acid is contacted with the hot furnace gas and heated to 80° C.; in a second step, the acid is heated to 160° C., liberating the majority of the HF. A further improvement in U.S. Pat. No. 4,460,551 is that the major portion of the sulfuric acid is bypassed around the vent gas scrubber and thus does not pick up any HF; the HF-containing sulfuric acid stream, after the bulk of the HF is stripped out, is then diluted with the bypassed acid before being fed to the furnace, resulting in a still lower HF concentration in the furnace feed acid. In order to obtain the desired high furnace feed acid temperature (>100° C.), the bypassed sulfuric acid is heated to 140° C. One practical drawback to the concept of U.S. Pat. No. 4,460,551 is that in order to heat the HF-containing acid to 160° C. and the bypassed sulfuric acid to 140° C., expensive materials of construction must be used, and even then this equipment will be subject to periodic failure, necessitating costly replacement. Furthermore, as will be shown below in the discussion of the present invention, water content is critical in attaining a high degree of HF removal; no means exists in U.S. Pat. No. 4,460,551 for adjusting or assuring an optimal water concentration in the HF removal step, and in fact the stated water concentration of 9% is somewhat less than optimal.

It is thus apparent from the foregoing that a need exists for an improved more efficient and economical process for HF manufacture. There is also a significant incentive in terms of HF furnace operating and capital cost to reduce the level of HF in the furnace feed acid. The present invention provides an improved method for reducing HF in the furnace feed acid, taking advantage of some unusual physico-chemical equilibrium properties of this system. The method of the invention overcomes the drawbacks of the above prior processes and represents a simple, straighforward method for minimizing the HF content of the furnace feed acid by taking advantage of hitherto unrecognized physical and chemical properties of this system.

SUMMARY OF THE INVENTION

In accordance with the invention, we have discovered that the equilibrium HF concentration, in mixtures of HF, sulfuric acid and water, is greatly influenced by the water content of the mixture. Surprisingly, we have found that an optimum water concentration exists at which the equilibrium HF concentration is at a minimum. This effect is shown in FIG. 3 where it can be seen that the minimum HF concentration is obtained at a water content of about 12.5 wt. percent which is higher than the water concentrations mentioned in the prior art. Recognizing the importance of operating an HF removal process at the optimum water concentration, and keeping in mind the mechanical and materials-of-construction problems associated with indirect heating of feed acid we developed a process for injecting a controlled amount of steam directly into the HF removal process. This approach offers the following clear advantages over prior art:

1. The process can be operated at the optimum water level for HF removal; this will result in minimal levels of HF in the furnace feed acid, benefitting furnace operation.

2. Direct steam injection supplies additional heat without the mechanical, materials-of-construction, reliability, and maintenance problems associated with indirect heat exchangers, where heated surfaces are subjected in pressure vessels to the corrosive environment associated with feed acid.

3. Direct steam injection adds water to the process; in order to keep the furnace feed acid water concentration at desireable levels (less than 1%), additional oleum or $SO_3$ is injected in order to neutralize this extra water:

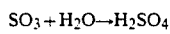

$$SO_3 + H_2O \rightarrow H_2SO_4$$

The $H_2SO_4$ produced by the above reaction significantly decreases the amount of additional sulfuric acid which must be fed to the process and passed over the plant vent gas scrubber, reducing the flow rate of the sulfuric acid stream which contains HF and from which HF must be removed. Moreover, the present invention is advantageous in that, because the $SO_3$—$H_2O$ reaction is exothermic, no additional indirect heat exchanger is needed to achieve the high desired furnace feed acid temperature ($>100°$ C.).

BRIEF DESCRIPTION OF THE DRAWING

FIG. 2 is diagrammatic representation showing the equilibrium HF concentration showing weight percent HF vs. Temperature in °C.

FIG. 3 is another diagrammatic representation showing the equilibrium HF concentration of weight percent HF vs. the weight percent water in the system.

DETAILED DESCRIPTION OF THE INVENTION

Figure 1:
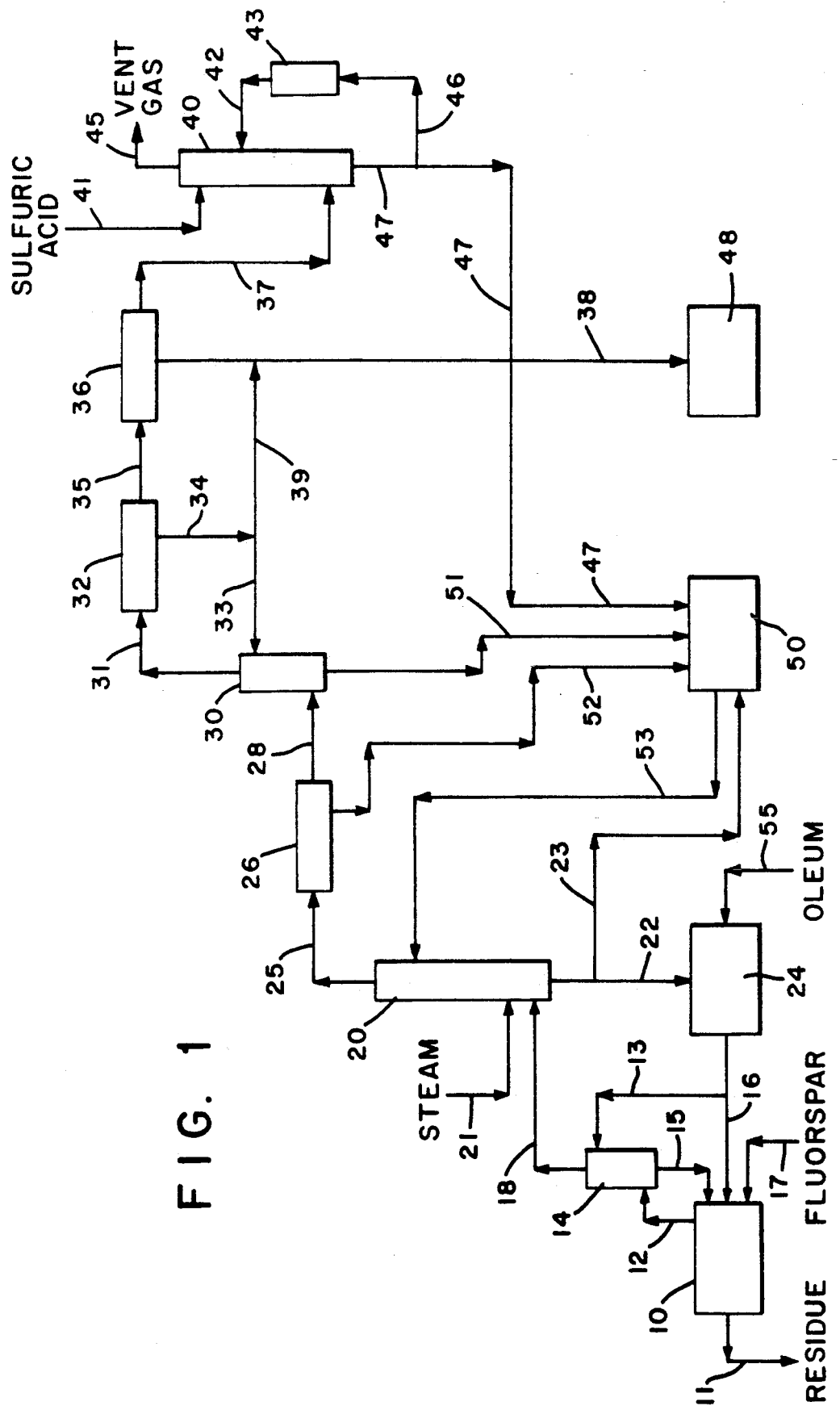
FIG. 1 is a schematic flow diagram illustrating the process according to the invention.

To illustrate the advantages of the process of the present invention, reference is made to the figures of the drawing, and in particular to FIG. 1 which is a schematic flow diagram of the process. As shown therein, fluorspar 17 and a sulfuric acid mixture 16 are fed to an externally heated furnace 10 where the following reaction takes place:

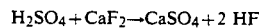

$$H_2SO_4 + CaF_2 \rightarrow CaSO_4 + 2\,HF$$

The $CaF_2$ is discharged as a solid 11 from the furnace. Hot gas 12 comprised mainly of HF but containing impurities such as $H_2O$, $H_2SO_4$, $SO_2$, $SO_3$, $SiF_4$, phosphates, and dust passes through a dust separator 14 where a minor portion of the sulfuric acid mixture 13 fed to the furnace is introduced to scrub the dust out of the hot gas. The scrubbing acid 15 flows from the dust separator to the furnace, while the hot gas 18, now substantially dust-free, passes to the HF-removal step 20.

The essence of the invention relates to the HF-removal step 20. In the HF-removal step 20, which can take place in any stardard vapor-liquid contacting device (packed column, spray tower, tray column, etc.) the hot gas 18 from the dust separator and direct injection of steam 21 are used to remove the bulk of the HF from an inlet sulfuric acid mixture 53 which is obtained from later cooling, scrubbing, and purification stages in the process, prior to feeding the sulfuric acid mixture to the reaction furnace. In the HF-removal step 20, a controlled amount of steam is injected and condenses, leaving with the sulfuric acid mixture 22 which is drawn off from the bottom of the contacting device. In accordance with our discovery, the proper amount of steam is injected so that the water content of the sulfuric acid mixture is at the optimum water concentration for HF removal, which is about 12.5 wt. percent. This discovery involving the control of water concentration to optimize HF removal has not been recognized in the prior art. In the prior art referred to hereinabove, for example, water concentrations are less than the optimum of about 12.5 wt. percent shown in FIG. 3 (4% for U.S. Pat. No. 3,919,399, 6–10% for U.S. Pat. No. 4,150,102, and 9% for U.S. Pat. No. 4,460,551). Heat to remove the HF from the sulfuric acid mixture is supplied by the condensation of the steam and by the hot gas stream 18 from the dust separator. It is possible to achieve a leaving sulfuric acid mixture temperature in excess of 150° C. by these means without the need for the indirect heat exchanger which would be required in the absence of direct steam injection (as disclosed, for example, in U.S. Pat. Nos. 3,919,399 and 4,460,541).

As a result of direct steam injection, the sulfuric acid mixture 22 leaving the HF-removal step contains too much water to be fed directly to the reaction furnace (water, like HF, requires additional heat in the furnace for vaporization). Hence, in the present invention, the sulfuric acid mixture is reacted with oleum 25 in the furnace feed acid tank 24 prior to being fed to the furnace. A pure SO$_3$ stream can be used instead of oleum. In either case, water in excess of the desired 0-1% is removed by the following reaction:

$$SO_3 + H_2O \rightarrow H_2SO_4$$

The H$_2$SO$_4$ produced by this reaction significantly decreases the amount of additional sulfuric acid 41 which must be passed over the plant vent gas scrubber 40; this has an equivalent effect to that of bypassing sulfuric acid around the scrubber as specified in U.S. Pat. No. 4,460,551—namely, reducing the amount of sulfuric acid which picks up HF. However, the present invention is superior in that because the SO$_3$—H$_2$O reaction is exothermic, no additional indirect heat exchanger is needed (as it is in U.S. Pat. No. 4,460,551) to achieve the high desired furnace feed acid temperature (>100° C.).

Referring again to the process of the invention as illustrated in FIG. 1, the HF gas stream 25 leaving as the overheads stream from the HF-removal step is cooled via indirect heat exchange with cooling water in cooler 26. A liquid condensate stream 52 from cooler 26, containing HF, fluosulfonic acid, H$_2$SO$_4$ and water is returned to the HF-removal step via collection tank 50. The HF gas stream (28) leaving the cooler 26 is next scrubbed with liquid HF 33 in a wash column 30 to remove the bulk of the remaining H$_2$SO$_4$, fluosulfonic acid, and water. The bottoms liquid stream 51 removed from the wash column is returned to the HF-removal step via collection tank 50. The HF gas stream 31 leaving overhead from the wash column 30 is condensed in a two stage indirect condensing system, using brine in condenser 32 and refrigerant in condenser 36. Part of the HF condensate 33 is returned as scrubbing liquid to the wash column 30; the remainder of the HF condensate is withdrawn as product 38. The vent gas 37 from the condensing system still contains a significant quantity of HF. This HF is recovered by scrubbing the gas stream 37 with sulfuric acid 41 in a scrubbing column 40; the heat of absorption of the HF is removed in a circulating cooler 43. The sulfuric acid stream 47 leaving the bottom of the scrubbing column 40 contains HF, and is sent to the HF-removal step via collection tank 50. The overhead vent 45 from the scrubbing column is substantially free from HF, and passes to the final scrubbing system for disposal.

The invention will be further described by reference to the following illustrative examples. It will be understood, however, that although the examples describe in detail certain preferred operating conditions of the invention, they are given primarily for purposes of illustration and the invention in its broader aspects is not limited thereto.

EXAMPLE I

Referring to FIG. 1., 12,311 Kg/hr of fluorspar ore 17, containing about 97% CaF$_2$, is fed to an externally heated furnace 10 along with 15,760 Kg/hr of sulfuric acid 16 from feed acid tank 24 at 110° C., containing about 0.5% of HF and 0.5% of H$_2$O. A minor portion of the sulfuric acid 13 is introduced to the furnace via a dust separator 14. In the furnace the sulfuric acid and CaF$_2$ react to form HF and calcium sulfate:

$$H_2SO_4 + CaF_2 \rightarrow CaSO_4 + 2HF$$

The calcium sulfate, containing less than 1-2% of unreacted CaF$_2$ and H$_2$SO$_4$, is discharged as a solid at 200° C. from the furnace 11.

The HF reaction product leaves the furnace as a gas at about 200° C., contaminated with air, CaF$_2$ and/or CaSO$_4$ dust, water, SiF$_4$, SO$_2$, SO$_3$, H$_2$SO$_4$, phosphates, and other impurities produced from minor constituents of the fluorspar 17.

The hot furnace gas is first passed through a dust separator 14 where it is contacted with a minor portion of the sulfuric acid 13 fed to the furnace to scrub the dust from the furnace gas and wash it back into the furnace 15.

The gas leaving the dust separator 18 at about 175° C. is next contacted with 5692 Kg/hr sulfuric acid 53 from collection tank 50 in a stripping column 20. In this column, the gas is cooled to about 100° C., and the bulk of the water, H$_2$SO$_4$, and SO$_3$ are removed from the gas stream. The sulfuric acid from tank 50 is fed to column 20 at about 30° C., and contains about 22% HF, partially present as fluosulfonic acid formed by the reaction:

$$HF + H_2SO_4 \rightarrow HFSO_3 + H_2O$$

In column 20, the sulfuric acid is heated to 160° C. and most of the HF and fluosulfonic acid vaporized. The hot sulfuric acid from column 20, containing 2% HF and 12.5% H$_2$O, is discharged to feed acid tank 24 through pipe 22.

315 Kg/hr of steam 21 is injected into column 20. This steam condenses and is absorbed by the sulfuric acid, supplying additional heat for vaporizing HF and heating the sulfuric acid, and resulting in the optimum water concentration in the sulfuric acid for HF removal.

The hot sulfuric acid 22 discharged from column 20 is mixed in the feed acid tank 24 with 11,156 Kg/hr of 20% oleum 25. The SO$_3$ in the oleum reacts with water in the hot sulfuric acid:

$$SO_3 + H_2O \rightarrow H_2SO_4$$

Enough oleum is added to give a resulting water concentration in the furnace feed acid of 0.5% which is close to the optimum for furnace operation. The above reaction is exothermic. The resulting furnace feed acid temperature is about 110° C.

The cooled gas stream 25, 8260 Kg/hr, leaving column 20, still contains air, SO$_2$, SiF$_4$, H$_2$O, phosphates, minor amounts of H$_2$SO$_4$, and up to 10% of fluosulfonic acid which is vaporized in column 20.

The gas stream is cooled to about 40° C. by indirect exchange with cooling water in a gas cooler 26. A large portion of the fluosulfonic acid, sulfuric acid and water are condensed in this cooler 26 and recycled via collection tank 50 to stripping column 20.

The gas stream from gas cooler 26 is further cooled to 20° C. in a wash column 30. In this column, 6485 Kg/hr of liquid HF 33 is introduced to cool the gas. The HF also removes all but trace amounts of the remaining H$_2$O and fluosulfonic acid from the gas stream. Liquid from the bottom of wash column 30, 519 Kg/hr, comprising mostly HF and fluosulfonic acid, is recycled through pipe 51 via collection tank 50 to stripping column 20.

Gas from wash column 30 passes through pipe 31 to the HF condensing system. Preferably, this is a two stage system. First, HF is condensed at 10°-15° C. using indirect heat exchange with brine in condenser 32. Part of the condensed HF 34 is returned to wash column 30 through pipe 33; the remainder is removed as HF product 39. Gas from condenser 32 flows to the final condenser 36, where HF is condensed at −5° C. using indirect heat exchange with a refrigerant. Condensed HF from the final condenser is removed as product 38.

HF product 38, 5814 Kg/hr, is substantially free of $H_2O$, $H_2SO_4$, fluosulfonic acid and phosphate compounds. Concentrations of volatile impurities such as $SO_2$ and $SiF_4$ may be too high for some uses; however, these impurities can very easily be removed by a subsequent simple distillation step. The overhead gas from such a distillation can easily be recycled to the HF production process, preferably to the acid scrubbing column 40.

Gas 37 from the final condenser 36, 1262 Kg/hr, still contains about 53% HF, the balance being gases such as air, $CO_2$, $SO_2$, $SiF_4$, and phosphate compounds such as $PF_5$. This gas is contacted with 3856 Kg/hr of 99.3% sulfuric acid 41 in the acid scrubbing column 40. In this column, the bulk of the HF is absorbed in the sulfuric acid. A cooler 43 is provided to remove the heat of absorption.

The gaseous stream 45 leaving the acid scrubbing column 40, 610 Kg/hr containing about 3% HF, flows to a final scrubbing system for disposal.

The sulfuric acid stream 47 leaving the acid scrubbing column 40, 4508 Kg/hr containing 14% HF partially present as fluosulfonic acid, flows to collection tank 50 where it is mixed with the condensed stream 52 from gas cooler 26 and the liquid stream 51 from wash column 30 and then fed to stripping column 20 where the acid is heated, water content adjusted and the HF removed.

The preferred embodiment of the invention was described in the previous section. Modifications, as listed below, can be made to the process without affecting the principles claimed.

EXAMPLE II

A portion of the sulfuric acid stream 23 leaving stripping column 20 can be sent to collection tank 50 for recycle to the stripping column feed. Depending on mechanical equipment design, this may have certain advantages (e.g. resulting in higher liquid loading in column 20 which may more effectively wet the column packing should a packed column be used). Additionally, the resulting higher water level in the column feed will minimize the fluosulfonic acid content of the column overheads.

EXAMPLE III

The process may be operated so that a single final HF condenser can be used rather than a two-stage system, as in condensers 32 and 36. The two-stage system is advantageous, however, as it allows a large part of the heat to be removed at a higher temperature and hence a less expensive mechanical refrigeration system is required.

EXAMPLE IV

In the operation of the process of the invention, the gas cooler 26 can be eliminated and the entire gas cooling function done by direct heat exchange with liquid HF in wash column 30. Use of a gas cooler is preferred, however, as a large part of the heat can be thusly removed by cooling water which is less costly than refrigeration.

While particular embodiments of the invention have been described, it will be understood that, primarily the invention is not limited to the specific details given for illustative purposes, since many modifications may be made, and it is, therefore, contemplated to cover by the appended claims any such modifications as fall within the true spirit and scope of the invention.

What is claimed is:

1. In a method for the production of substantially anhydrous hydrofluoric acid in a process having at least two stages, comprised of:
    a. a first reaction stage in which fluorspar and a sulfuric acid mixture are reacted at a temperature in excess of 150° C. to produce gases containing mainly hydrogen fluoride, and
    b. a second HF-removal stage in which an HF-containing sulfuric acid stream recycled from later cooling, purification and scrubbing stages is contacted with the hot gases leaving the first stage;
    the improvement comprising injecting steam into the second stage such that the water content of the sulfuric acid mixture is adjusted within the range of 8-25 weight percent to enhance HF removal and to provide additional heat to promote HF removal.

2. The process according to claim 1 wherein the controlled amount of steam is injected to adjust the water content of the sulfuric acid mixture to the range of about 10 to 15 weight percent.

3. A process according to claim 1 wherein the second stage is conducted in a vapor-liquid contacting device, sulfuric acid mixture leaves the second stage from the bottom of the contacting device at 125°-175° C., and the HF gas leaves the second stage as the overheads stream at 90°-130° C.

4. A process according to claim 1 wherein the hot gases leaving the reaction stage, prior to passing to the HF removal stage, are contacted with a portion of the sulfuric acid mixture fed to the reaction stage, the purpose being to remove the bulk of the entrained dust from the gas.

5. A process according to claim 1 wherein the sulfuric acid mixture from the second stage, prior to being fed to the first reaction stage, is reacted with oleum or $SO_3$ to adjust the concentration of water in the acid to below about 1 percent by weight.

6. A process according to claim 1 wherein the sulfuric acid mixture is fed to the first reaction stage at a temperature of 100°-150° C.

7. A process according to claim 1 wherein the HF-containing sulfuric acid mixture fed to the second stage is comprised of liquid condensed from the HF gas stream leaving the second stage in an indirect cooling stage operated at 30°-60° C.

8. A process according to claim 1 wherein the HF-containing sulfuric acid mixture fed to the second stage is comprised of liquid obtained as the bottoms stream of a column in which the HF gas stream leaving the second stage or subsequent cooling stages is contacted with liquid anhydrous HF for the purpose of removing impurities.

9. A process according to claim 1 wherein the HF-containing sulfuric acid mixture fed to the second stage is comprised of liquid obtained as the bottoms stream from a column in which vent gases leaving the process are scrubbed with sulfuric acid for the purpose of recovering HF from these vent gases.

10. A process according to claim 1 wherein part of the HF present in the sulfuric acid mixtures fed to either the first or second stages may be present in the form of fluosulfonic acid.

* * * * *